United States Patent
Soerensen et al.

(10) Patent No.: US 7,454,169 B2
(45) Date of Patent: Nov. 18, 2008

(54) METHOD AND APPARATUS FOR USE IN SECURING AN ELECTRONIC DEVICE SUCH AS A CELL PHONE

(75) Inventors: Joern Soerensen, Aars (DK); Palle Birk, Gistrup (DK); Frederic Boutaud, Belmont, MA (US)

(73) Assignee: MediaTek Inc. (TW)

( * ) Notice: Subject to any disclaimer, the term of this patent is extended or adjusted under 35 U.S.C. 154(b) by 387 days.

(21) Appl. No.: 10/208,965

(22) Filed: Jul. 31, 2002

(65) Prior Publication Data

US 2004/0204003 A1 Oct. 14, 2004

Related U.S. Application Data

(60) Provisional application No. 60/378,833, filed on May 8, 2002.

(51) Int. Cl.
*H04B 1/06* (2006.01)
(52) U.S. Cl. ............... 455/26.1; 455/418; 726/26; 726/27; 713/187; 713/194
(58) Field of Classification Search ............ 455/411, 455/410, 414.1, 551, 550.1, 419, 418, 26.1; 380/247–250; 379/189, 161, 168; 726/26, 726/27
See application file for complete search history.

(56) References Cited

U.S. PATENT DOCUMENTS

| | | | |
|---|---|---|---|
| 5,224,160 A | | 6/1993 | Paulini et al. |
| 5,379,343 A | * | 1/1995 | Grube et al. ............... 455/410 |
| 5,483,465 A | * | 1/1996 | Grube et al. ............... 340/7.41 |
| 5,483,658 A | | 1/1996 | Grube et al. |
| 5,659,595 A | * | 8/1997 | Chanu et al. .............. 455/411 |
| 5,883,960 A | * | 3/1999 | Maruyama et al. ........ 380/249 |
| 5,933,773 A | * | 8/1999 | Barvesten ................. 455/411 |
| 6,148,192 A | * | 11/2000 | Ahvenainen ............... 455/410 |
| 6,167,252 A | | 12/2000 | Cohen |
| 6,243,468 B1 | * | 6/2001 | Pearce et al. .............. 380/255 |
| 6,427,073 B1 | * | 7/2002 | Kortesalmi et al. ........ 455/414.1 |

(Continued)

OTHER PUBLICATIONS

"PCS Operators and Handset Manufacturers Now Look to Flash Memory for 'Anytime, Anywhere' Code and Data Management as Well as Enhanced System Security to Reduce Fraud.", www.intel.com.

(Continued)

*Primary Examiner*—Vincent P. Harper
*Assistant Examiner*—Khai M Nguyen
(74) *Attorney, Agent, or Firm*—Fish & Richardson P.C.

(57) ABSTRACT

The present invention is directed to methods and apparatus which may be used to help prevent electronic devices, including cell phones, from operating with software copied from (and only authorized for use by or on) another device. A further aspect is a device, including a cell phone, for example, that employs any of such methods and apparatus. Aspects of the present invention compare a program identifier (associated with software stored in a device) to a reference identifier for the device, so as to determine whether the software is authorized for use with that device. Some embodiments respond to the comparison substantially in hardware, so that the software being checked is less able to prevent the device from being disabled in the event that the program identifier and the reference identifier do not match one another.

43 Claims, 8 Drawing Sheets

U.S. PATENT DOCUMENTS

| | | | |
|---|---|---|---|
| 6,483,930 B1 * | 11/2002 | Musgrave et al. | 382/117 |
| 6,542,731 B1 * | 4/2003 | Alos | 455/411 |
| 6,553,495 B1 * | 4/2003 | Johansson et al. | 713/200 |
| 6,704,872 B1 * | 3/2004 | Okada | 713/194 |
| 6,889,209 B1 * | 5/2005 | Rabin et al. | 705/57 |
| 2001/0029190 A1 * | 10/2001 | Mashiko | 455/551 |
| 2004/0059938 A1 * | 3/2004 | Hughes et al. | 713/200 |
| 2004/0235514 A1 * | 11/2004 | Bloch et al. | 455/550.1 |

OTHER PUBLICATIONS

3 Volt Intel® StrataFlash™ Memory (J3) Product Overview, Intel, http://developer.intel.com/design/flcomp/prodbref/298044.htm, pp. 1-3.

"Designing with the Advanced+ Boot Block Flash Memory Architecture", Intel Application Note AP-657, Dec. 1998, pp. 1-17.

3 Volt Advanced+ Boot Block Flash Memory Preliminary Data Sheet, Intel, Jun. 1999, pp. 1-59.

International Search Report for PCT Application US03/14013.

* cited by examiner

METHOD AND APPARATUS FOR USE IN SECURING AN ELECTRONIC DEVICE SUCH AS A CELL PHONE

PRIORITY CLAIM

This application claims priority under 35 U.S.C. §119(e) of Provisional Application No. 60/378,833, filed on May 8, 2002, entitled "METHOD AND APPARATUS FOR USE IN SECURING AN ELECTRONIC DEVICE SUCH AS A CELL PHONE".

FIELD OF THE INVENTION

The present invention relates to electronic devices and, more particularly, to devices that use software and where it is desired to make it difficult to use a software-based electronic device (a cellular telephone, for example) that has been reprogrammed without authorization.

BACKGROUND OF THE INVENTION

Cellular or cell phones, sometimes called mobile phones, are commonly used in mobile communication systems. Most, if not all, cell phones are software-based devices, meaning that they have one or more internal computers, i.e., processors, and software that directs the operation of such processor(s). This approach presents several possible advantages to the cell phone manufacturer. First, the development time and life cycle costs may be less than would be required if cell phones were not software-based. Second, the operating characteristics are in large part a function of the software stored in the phone. This makes it possible for a manufacturer to produce various models of cell phones by simply developing different versions of software, one for each model of phone.

One problem however, is that users sometime attempt to "reprogram" a cell phone by copying the software from another phone, without permission or authorization from the manufacturer. This occurs in two different contexts. The first context is where a user seeks to upgrade a phone without paying for the upgrade. For example, in some instances, a low end phone can be converted into a high end phone by simply copying the software from the high end phone into the low end phone. This reduces the potential for high-end phone sales and thereby hurts the profits of the phone manufacturer, as well as the profits of the high-end software supplier. The second context is where a user seeks to use a stolen phone. This is because each phone is assigned a unique code, commonly referred to as an IMEI (International Mobile Equipment Identity) code, which is used to help prevent the use of stolen phones. The IMEI code is typically embedded in the phone software and transmitted to the communication network when a user initiates a call. The network compares the transmitted IMEI code to a database to determine whether the phone has been reported as stolen. If the phone has been reported stolen, the network does not allow it to make calls over the network. But a problem arises because the IMEI check is rendered ineffective if the stolen phone is reprogrammed with software (including the IMEI code) copied from a legitimate phone (i.e., a phone that has not been stolen). Thereafter, the stolen phone transmits a seemingly legitimate IMEI code and is allowed to make calls over the network.

Thus methods are sought to help prevent a phone from operating with software copied from (and only authorized for use by) another phone.

Several methods currently exist. One method requires the user to enter a PIN (Personal Identification Number) code or license number when the telephone is switched on. However, this method does not prevent the stolen or initially low-end phone from being able to operate with the copied software; rather, it simply requires that the user enter the PIN code or license number of the authorized or high-end phone.

A second method provides each phone with a hardware identifier. The software in the phone reads the hardware identifier, compares it to a reference identifier, stored in the software, and disables the phone if the hardware identifier does not match the reference identifier. However, this method can be defeated relatively easily. A debugger and/or an emulator can be used to identify the portion of the software that carries out the check and disable operations. Those portions of the software can then be replaced or altered.

Accordingly, other methods to help prevent electronic devices such as phones from operating with software copied from (and only authorized for use by) another device, are sought.

SUMMARY OF THE INVENTION

The present invention helps prevent electronic devices such as, for example, cell phones from operating with software copied from (and only authorized for use by) another device.

According to a first aspect of the present invention, a method for use within a processor core used in and to control such a device (e.g., phone) comprises: providing an input to receive a reference identifier from within the processor core; providing an input to receive a program identifier associated with a program stored in a system memory; generating data that signifies receipt, or lack thereof, of a reference identifier and a program identifier having at least a specified measure of correspondence to one another; and responding, substantially in hardware, to the data that signifies receipt, or lack thereof, including disabling an operating characteristic of the processor core unless the data indicates receipt of a program identifier and a reference identifier having at least a specified measure of correspondence to one another.

By responding to the comparison substantially in hardware, the software being checked will be less able to prevent the device from being disabled in the event that the program identifier and the reference identifier do not match one another.

According to another aspect of the present invention, a processor core comprises: a comparator that receives a reference identifier from within the processor core and a program identifier associated with software stored in a system memory, and generates data that signifies receipt, or lack thereof, of a reference identifier and a program identifier having at least a specified measure of correspondence to one another; and a disable system, responsive to the data indicative of a measure of correspondence, that generates a signal to disable an operating characteristic of the processor core unless the data indicates that there is at least a specified measure of correspondence between the program identifier and the reference identifier.

According to another aspect of the present invention, a processor core comprises: an input to receive a reference identifier from within the processor core; an input to receive a program identifier associated with software stored in a system memory; means for generating data that signifies receipt, or lack thereof, of a reference identifier and a program identifier having at least a specified measure of correspondence to one another; and means for responding, substantially in hardware, to the data that signifies receipt, or lack thereof, the means for responding including means for disabling an operating characteristic of the processor core unless the data indicates receipt of a program identifier and a reference identifier having at least a specified measure of correspondence to one another.

According to another aspect of the present invention, an electronic device comprises: a memory; software that is stored in the memory and includes a program identifier; a processor core coupled to the memory through a data path, the processor core including a comparator that receives the program identifier and a reference identifier, and in response thereto, generates a signal indicative of a measure of correspondence between the reference identifier and the program identifier, the processor core further including a disable system, responsive to the signal generated by the comparator and configured to disable an operating characteristic of the electronic device unless the signal indicates that there is at least a specified measure of correspondence between the reference identifier and the program identifier.

According to another aspect of the present invention, a cell phone for mobile communication is provided. The cell phone has a processor that includes a processor core and a memory, the processor core being coupled to the memory through a data path, the memory being usable to store software that includes a run-time program and an identifier associated with the software, wherein the improvement comprises: a comparator, within the processor core, that receives a reference identifier from within the processor core and a program identifier associated with software stored in a system memory, and generates data that signifies receipt, or lack thereof, of a reference identifier and a program identifier having at least a specified measure of correspondence to one another; and a disable system, within the processor core and responsive to the data indicative of a measure of correspondence, that generates a signal to disable an operating characteristic of the processor core unless the data indicates that there is at least a specified measure of correspondence between the program identifier and the reference identifier.

Notwithstanding the potential advantages, discussed above, of one or more embodiments of one or more aspects of the present invention, it should be understood that there is no absolute requirement that any embodiment of any aspect of the present invention address the shortcomings of the prior art.

DETAILED DESCRIPTION

The present invention is described below with respect to a cell phone 50 for use in connection with a mobile communication system, illustrated in FIG. 1. It should be recognized, however, that the present invention is not limited to use in cell phones or even to use in communication systems. A cell phone is merely an example of an electronic device such as may employ the present invention.

Figure 1:
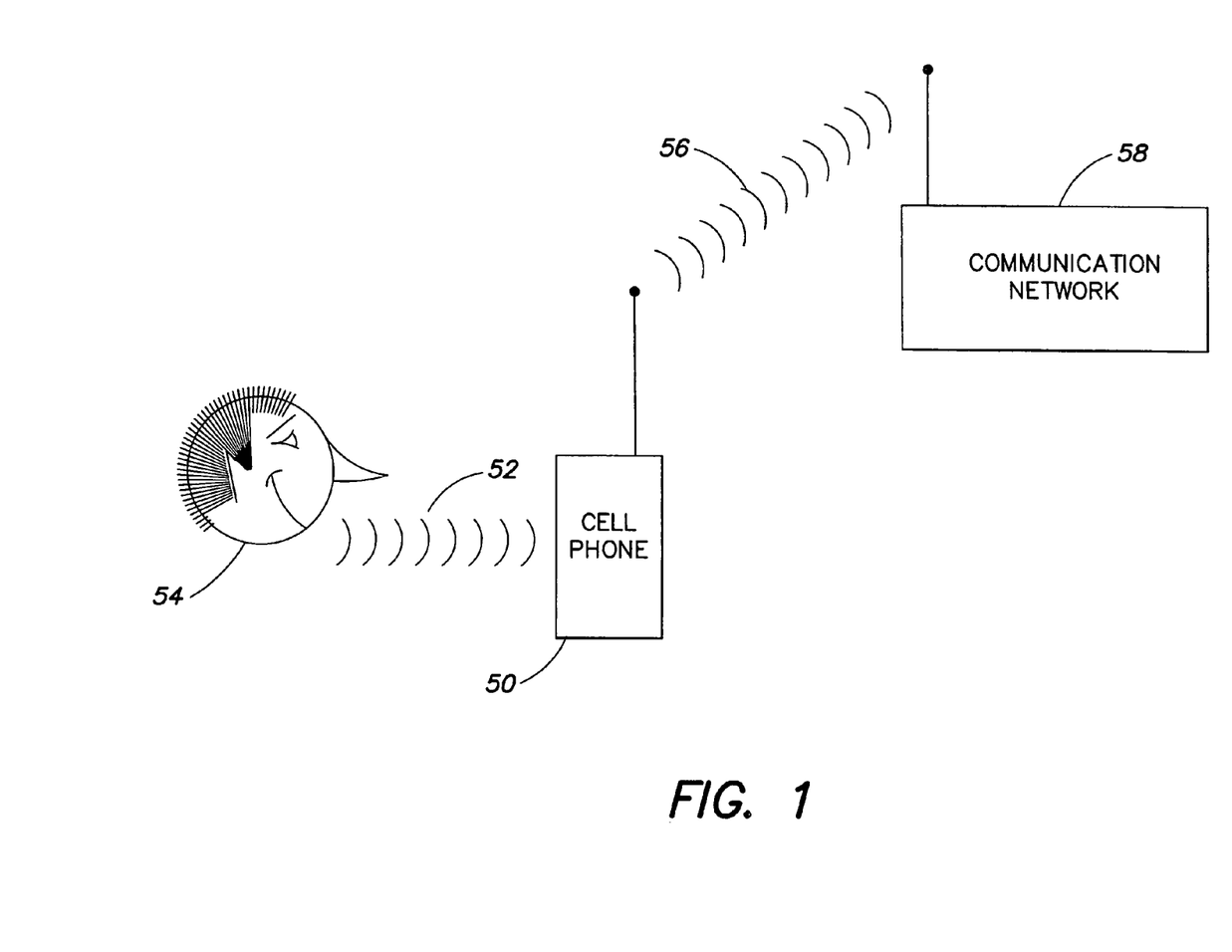
FIG. 1 is a block diagram of one embodiment of a mobile communication system that includes a cell phone and a cellular telephone network.

Referring now to FIG. 1, a cell phone 50 receives an input signal 52 from a user 54. The cell phone 50 processes the signal and generates an output signal 56, which is transmitted to a communication network 58. The input signal and the output signal are typically acoustical and radio signals, respectively, as shown.

The cell phone 50 includes one or more processors (not shown in FIG. 1). One such processor is referred to as a baseband processor. The baseband processor performs signal processing operations (such as for example compression) and executes instructions that cause the IMEI code to be transmitted to the communication system.

Figure 2:
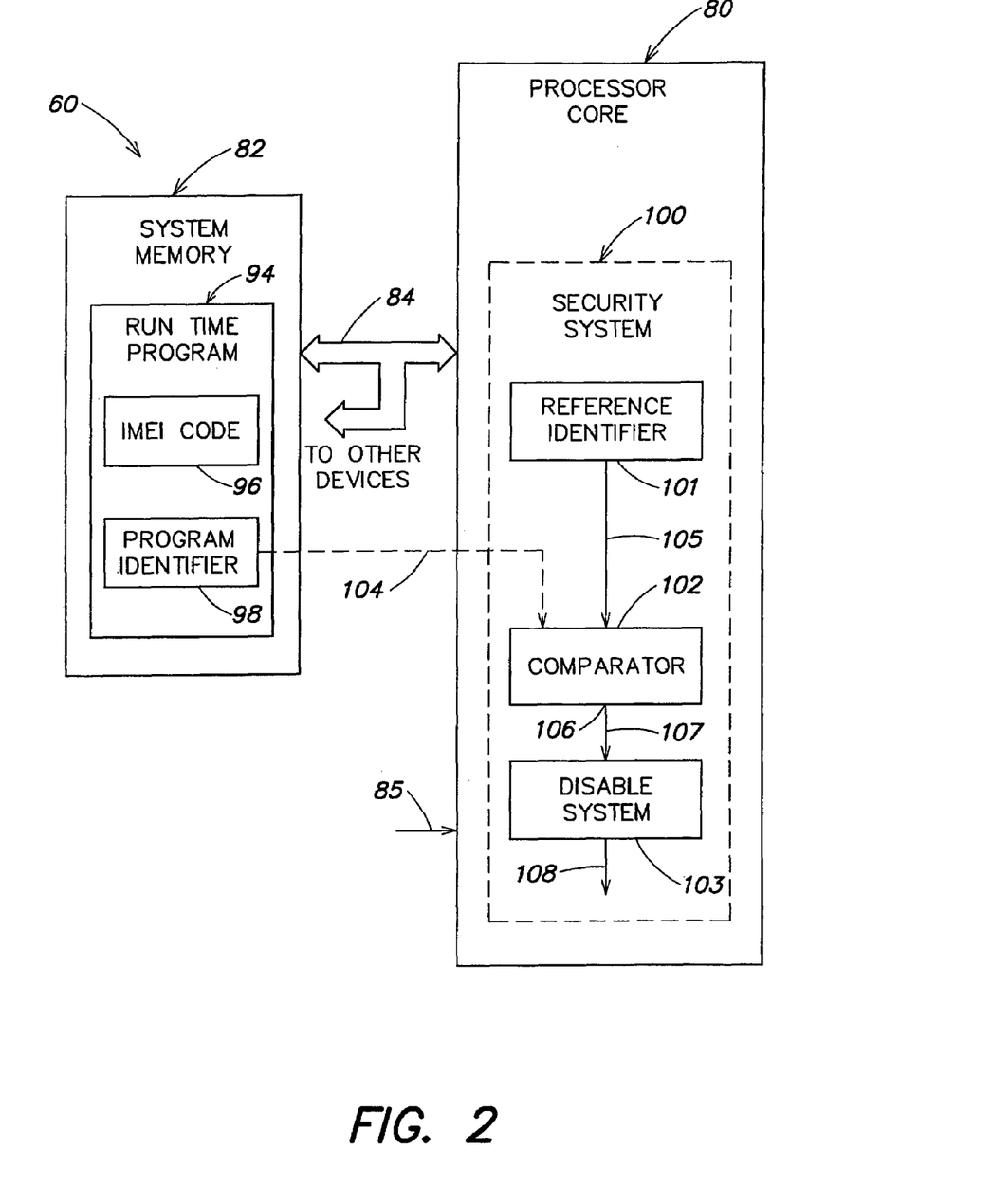
FIG. 2 is a block diagram of a portion of a baseband processor that may be used in the cell phone of FIG. 1, the baseband processor including a processor core with a security system according to one embodiment of the present invention.

FIG. 2 is a block diagram of a portion of a baseband processor 60, which may be used in the cell phone 50 of FIG. 1, according to one embodiment of the present invention.

The baseband processor 60 includes a processor core 80 and an associated memory 82. The associated memory 82 also is referred to herein as the system memory 82 or the user memory 82. The processor core 80 and the system memory 82 are connected by a bus 84. The bus is typically a parallel type interface and may further connect to other devices (not shown) that may or may not be part of the baseband digital processor 60. Although, not required, one or more other interfaces, e.g., a serial type interface 85, may also connect to the processor core 80.

The system memory 82 is used to store a run-time program 94. The run-time program 94 includes the IMEI code 96 and instructions to be executed by the processor core 80 during normal use of the phone (including instructions that cause the IMEI code 96 to be transmitted from the cell phone to the network (FIG. 1). The run-time program 94 further includes a program identifier 98 that may be used to help identify the software stored in the system memory. The program identifier 98 may have any form including, but not limited to, a digital code. The digital code may be stored in the system memory or generated in response to a series of instructions stored in the system memory.

The system memory 82 may have any form, including, but not limited to, a reprogrammable type of memory component (e.g., FLASH or EEPROM), a memory component that is replaceable, and/or combinations thereof. The system memory 82 may—but need not be—integrated on a chip with and/or into a single package with the processor core 80.

As discussed above, users sometime attempt to "reprogram" a cell phone by copying the software from (and only authorized for use by) another phone.

With this in mind, and referring again to FIG. 2, this embodiment of the processor core includes a security system 100 that helps prevent a cell phone from operating with software copied from (and only authorized for use by) another phone. The security system 100 includes a reference identifier 101, a comparator 102 and a disable system 103. As with the program identifier 98 discussed above, the reference identifier 101 may have any form, including but not limited to that of a digital code. The reference identifier 101 may be generated in advance and stored in a non volatile storage location, or may be generated during operation of the cell phone, for example as discussed hereinbelow with respect to FIG. 4.

In operation, data paths 104, 105 are used to supply the program identifier 98 and the reference identifier 101, respectively, to the comparator 102. The comparator 102 compares the identifiers 98, 101 and provides an output signal at 106. In this embodiment, the output signal is in the form of a digital logic signal. If the program identifier 98 and reference identifier 101 match one another, then the output signal will have a first (e.g., low) logic state (i.e., logic 0). If the program identifier 98 and the reference identifier 101 do not match one another, or if one or both of the identifiers are not received by the comparator 102, then the output signal will have a second (e.g., high) logic state (i.e., logic 1).

The comparator output signal is supplied through a data path 107 to the disable system 103. If the comparator output signal has a high logic state (which in this embodiment signifies that matching identifiers have not been received) then the disable system 103 generates a signal (which is provided on a data path 108) that disables an operating characteristic of the processor core 80. If the comparator output signal has a logic low state (which in this embodiment signifies that matching identifiers have been received) then the disable system 103 assumes that the run-time program 94 is authorized to be used with the cell phone and does not generate the signal that disables an operating characteristic.

It is expected that the reference identifier 101 will vary from cell phone to cell phone. This means that the reference identifier 101 of any particular cell phone should be different than the reference identifier 101 of most other cell phones of that make and model, but there is no requirement that every cell phone of a particular make and model have a unique reference identifier 101).

It is further expected that the cell phone manufacturer will take steps to ensure that a run-time program 94, authorized for use in association with a particular cell phone, will have a program identifier 98 that matches the reference identifier 101 of that cell phone. Various embodiments for doing this are discussed hereinbelow.

As used herein, a program identifier 98 and a reference identifier 101 match one another if the program identifier 98 and the reference identifier 101 have at least a specified measure of correspondence to one another. The specified measure of correspondence can vary from embodiment to embodiment. In some embodiments, the program identifier 98 and reference identifier 101 will have the specified measure of correspondence only if they are identical to one another. In other embodiments, the program identifier 98 and the reference identifier 101 will have the specified measure so long as they have a specified relationship to one another, even if they are not identical to one another.

The comparator 102, the disable system 103, and the data paths 105, 107 portions of the security system are preferably implemented substantially in hardware. When we use the term "substantially in hardware" we mean that the program being checked (e.g., the run-time program 94) does not have enough control over any of these portions to prevent the security system from disabling an operating characteristic when there is no match. Thus, there is either no control by the program being checked (e.g., the run-time program 94), or there is only limited control. This helps to make the security system more difficult to tamper with and/or defeat than the prior art methods discussed above.

It should be understood that the term "substantially in hardware" does not mean exclusively in hardware. For example, "substantially in hardware" does not preclude state machines, firmware and/or software that is not under the control of the program being checked. Such software may for example be buried within the core processor and inaccessible from outside the core processor (for example, operating on a separate address/data bus within the core processor). Indeed, the comparator 102 and the disable system 103 may be implemented in any form including, but not limited to, software, hardware, firmware, or any combination thereof. More particularly, the form of one or more of such elements may include, but is not limited to, rules, processes, functions, formulas, equations, linear feedback shift registers, look up tables, mappings, etc., or any combination thereof. Notwithstanding the above, some embodiments do implement the security system exclusively in hardware, for example, combinatorial logic and sequential registers.

It should be further understood that the term "substantially in hardware" does not mean that the comparator 102 and/or disable system 103 can not receive input from the program that is being checked. For example, the program being checked will typically provide the program identifier 98.

Figure 3:
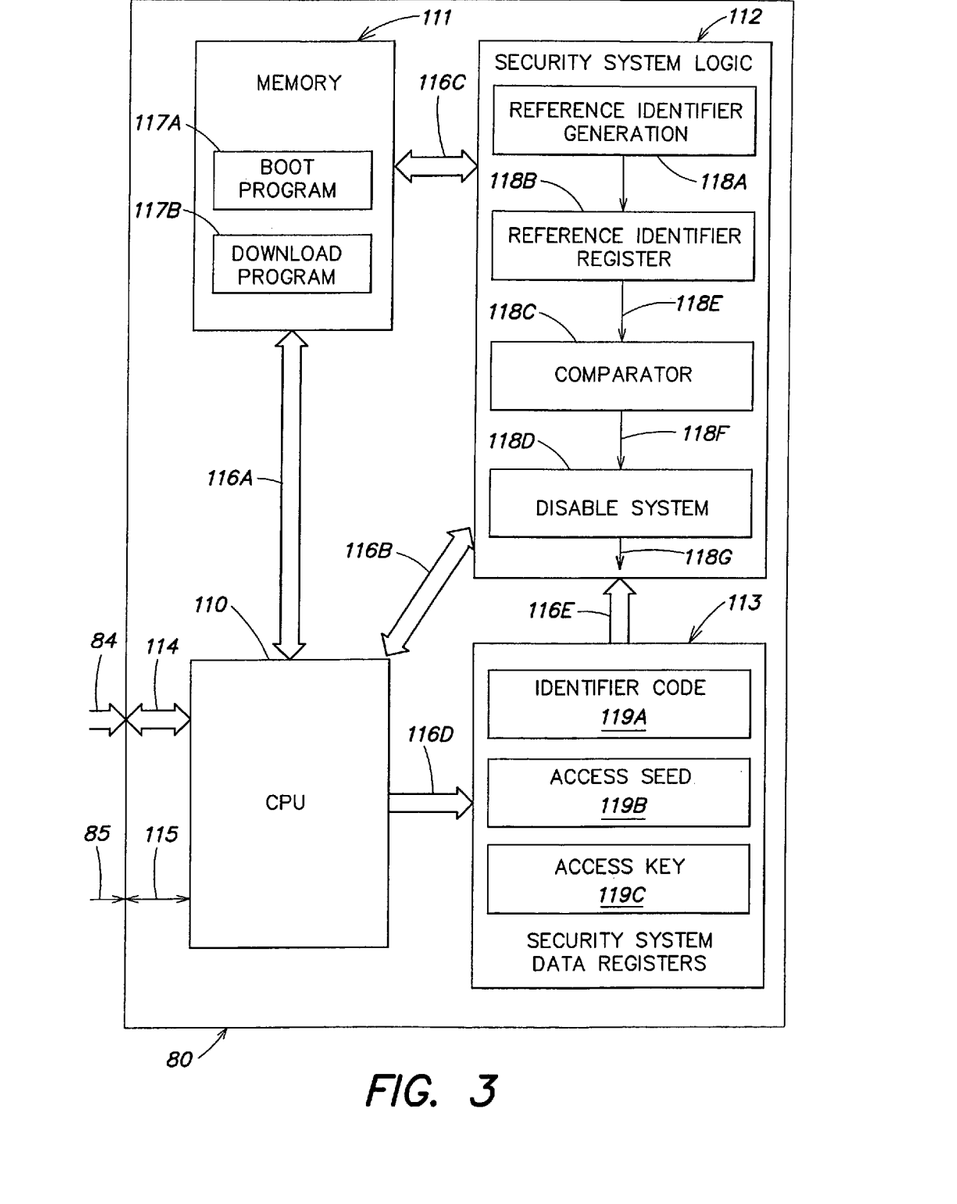
FIG. 3 is a block diagram showing one architecture of the processor core of FIG. 2.

FIG. 3 shows one architecture that may be used for the processor core 80 (FIG. 2). In this architecture, the processor core includes a central processor unit (CPU) 110, a memory 111, security system logic portion 112 and security system data register portion 113. The processor core 80 may include additional processor units (not shown) that operate in association with the CPU 110. Data paths 114, 115 connect the CPU 110 to the external interfaces 84, 85, respectively. Data paths 116A-116E connect the various processor core components to one another. It should be understood that although data paths 116A-116E are shown as being separate from one another, one or more of these may be combined with one another and/or with the data paths 114, 115. The processor core 80 is typically disposed on a single chip and/or integrated into a single package.

The memory 111 is referred to herein as processor memory 111 and is typically solely (or at least mostly) for use in providing functionality that is designed in by the manufacturer of the processor core 80. The processor memory 111 usually includes registers and/or a relatively small amount of memory. The memory may be of any type including but not limited to read only memory (ROM), random access memory (RAM), and combinations thereof. The memory 111 may—but need not—have a one time programmable portion.

The processor memory 111 may store a boot program 117A and a download program 117B. The boot program 117A may be executed on reset or power up and may include instructions to determine whether a run-time program 94 has been loaded into the system memory 82. If the boot program 117A determines that a run-time program 94 has been loaded into the system memory 82, then execution jumps to the run-time program 94. On the other hand, if the boot program 117A determines that a run-time program 94 has not been loaded into the system memory 82, then execution jumps to the download program. The download program 117B includes instructions that enable a run-time program 94 to be received and loaded into the system memory 82. This may occur for example during the production phase of the cell phone.

The security system logic portion 112 includes combinatorial logic circuits and synchronous registers 118A, 118B for generating and storing a reference identifier. The security system logic portion also includes combinatorial logic circuits 118C, 118D and data paths 118E, 118F and 118G for implementing one embodiment of the comparator 102, disable system 103 and data paths 105, 107 and 108 of FIG. 1, respectively. It should be recognized that the combinatorial logic and synchronous registers may be of any form and technology.

The security system data register portion 113 includes an identifier code register 119A, a seed register 119B and an access key register 119C, further discussed hereinbelow. Additional data registers for use in the security system may be placed in the security system data register portion 113 and/or in the security system logic portion 112, or elsewhere.

It should be understood that the FIG. 3 shows just one possible architecture for the processor core. The processor core is not limited to this architecture. Any other suitable architecture may also be used.

It is expected that there may be attempts to tamper with and/or defeat the security system 100 by reading the reference identifier 101 and then modifying the software to make the program identifier 98 match the reference identifier 101. There may also be attempts to alter the reference identifier 101 to match a program identifier 98. Thus, it is desirable to keep the reference identifier "hidden" from the normal user.

Consequently, the reference identifier 101 is preferably not directly accessible and not directly alterable from outside the security system. "Not directly accessible" means not readable by simply executing a read instruction that specifies an address at which the reference identifier 101 may be stored. The reference identifier 101 may, however, be indirectly accessible, for example by executing a predetermined sequence of operations that includes a read operation. It may be desirable to keep the predetermined sequence of operations confidential. "Not directly alterable" means not alterable by simply executing a write instruction that specifies an address at which the reference identifier 101 may be stored. The reference identifier 101 may, however, be indirectly alterable, including, but not limited to, for example, by executing a predetermined sequence of operations that includes a write operation. In addition, in some embodiments, the reference identifier 101 is not accessible through any external terminal.

It should be recognized that although the data paths 104, 105, 107 are shown as being separate from one another, one or more of the paths may be combined with each other. It should also be recognized that the logic convention described above is just one logic convention and that other logic conventions may also be used.

In some embodiments, the program identifier 98 and the reference identifier 101 are supplied to the comparator 102 and/or compared to one another only if a predetermined sequence of operations is executed. This helps to make it more difficult to tamper with and/or defeat the security system 100. A predetermined sequence of operations, may for example be a predetermined sequence of instructions and/or a predetermined sequence of operations on registers for example as is often done as part of Joint Test Access Group (JTAG) operations. This particular predetermined sequence of operations is referred to as a check sequence. It may be desirable to keep the check sequence confidential. It may also be desirable to limit the number of times that the reference identifier 101 can be compared to the program identifier 98 without resetting the cell phone. For example, in some embodiments, the security system 100 allows the program identifier and the reference identifier to be compared only one time after a power up or reset. If subsequent comparisons are attempted, the comparator 102 generates an output signal that signifies that matching identifiers have not been received; and in response, the disable system generates the signal that disables an operating characteristic of the phone.

Some embodiments disable the security system if an emulator is active. This helps to make it more difficult to use an emulator to discover information that could be used to tamper with and/or defeat the security system 100. It will be apparent that there are many ways to accomplish this. One way is discussed hereinbelow with respect to FIG. 5.

Furthermore, in the event that matching identifiers are not received, it may be desirable to disable an operating characteristic by initiating pseudo-random nonfunctional behavior and/or in a fashion that includes a delay such that the operating characteristic of the cell phone is disabled only after a specified duration i.e., a duration that is specified in advance of operation (i.e., predetermined) or determined during operation (i.e., dynamically).

Incorporating a delay can make it more difficult to discover information about how the security system is implemented, which could be used to tamper with and/or defeat the security system 100. It also increases the amount of time that one would need to "guess" the reference identifier (i.e., determine the reference identifier by trial and error) used in a particular cell phone. This in turn makes it more difficult to tamper with and/or defeat the security system. For example, if the delay is four seconds and the reference identifier is a thirty-two-bit digital code, then the time needed to guess the reference identifier could be as long as five hundred forty four years:

$$4 \text{ seconds} * 2^{32} = 544 \text{ years} \qquad \text{eqn. (1)}$$

It should be recognized that changing the number of bits used for the reference identifier will change the amount of time needed to guess the reference identifier. For example, if the delay is four seconds and the reference identifier reduces to only eight bits, then the time needed to guess the reference identifier is reduced to seventeen minutes:

$$4 \text{ seconds} * 2^{8} = 17 \text{ minutes} \qquad \text{eqn. (2)}$$

In some embodiments, one or more randomly generated, unused digital codes are embedded into the software in the system memory so that the program identifier and the IMEI code are not the only differences in the software between cell phones of similar make and model.

Figure 4:
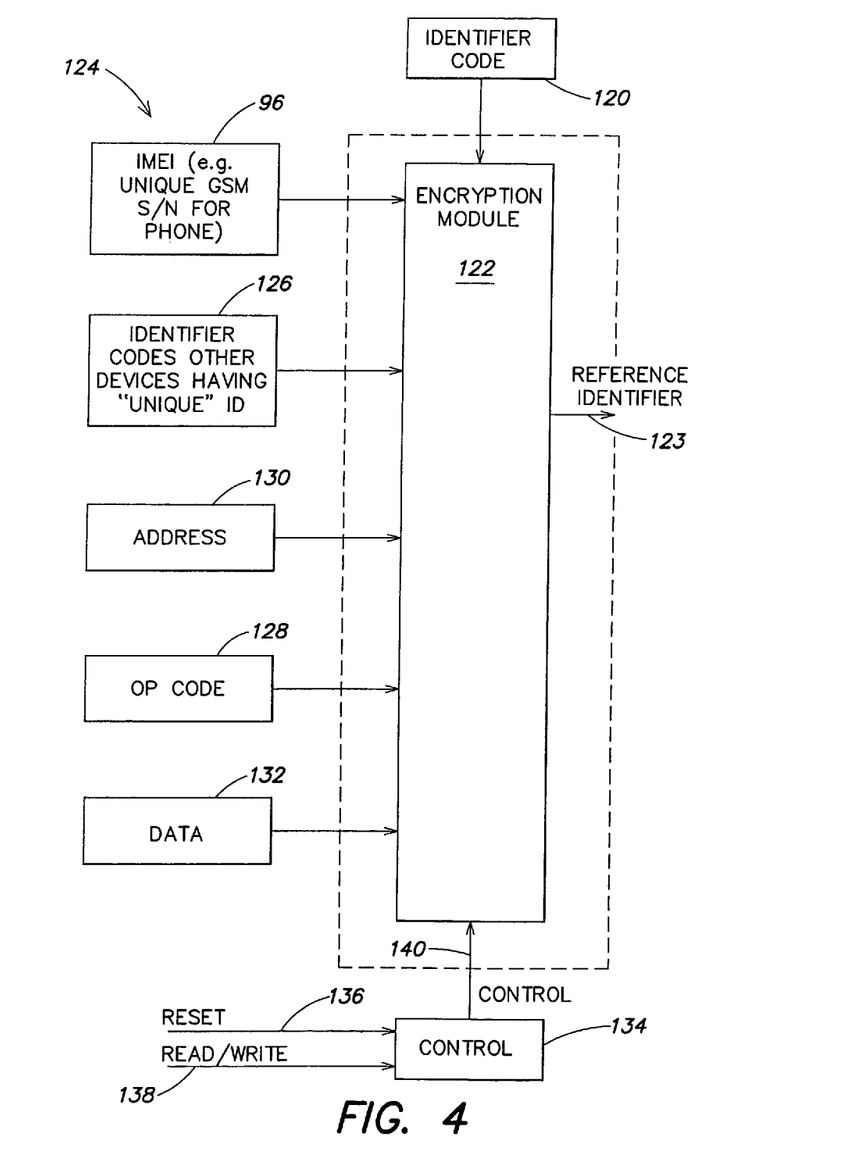
FIG. 4 is a block diagram of one embodiment for generating a reference identifier used in the security system of FIG. 2.

FIG. 4 shows one embodiment for generating the reference identifier 101 during operation of the cell phone. In this embodiment, each processor core is equipped with an identifier code 120. The identifier code 120 may vary from one processor core to another, although there is no requirement that every processor core have a unique identifier code 120. The identifier code 120 is typically stored in a non-volatile register or memory location (referred to herein as the identifier code register). For example, the identifier code 120 may be made part of the physical netlist for the processor core (e.g., in a ROM portion of a processor memory, if the processor core includes such) or part of a one time programmable portion of the processor core (if the processor core includes such).

The identifier code 120 is supplied to an encryption module 122. One or more other codes 124 may also be provided to the encryption module 122. Such other codes 124 may include, but are not limited to, the IMEI code 96, one or more identifier codes 126 associated with one or more other components in the cell phone, data indicative of one or more instructions that have been executed by the processor (for example, but not limited to data indicative of at least one of: at least one op code 128, at least one address 130, and at least one data word 132), or any combination thereof. Another possible code may be generated in response to all of the instructions (including all op codes, all addresses, and all data words) executed by the processor core within a particular interval of time.

The encryption module 122 generates the reference identifier (which is output on a data path 123) in accordance with an encryption strategy, using the codes 120, 124 as seeds. In some embodiments, the encryption module 122 has the form of a pseudo-random generator, but the encryption module is not limited to such. As used herein, the term "encryption strategy" includes any type of encryption strategy, generated in any manner. The encryption strategy may be predetermined and constant, but is not limited to such. The encryption strategy will typically be specified by, or on behalf of, designers of the baseband processor 60 or the manufacturer of the cell phone, or any combination thereof. Further, the encryption strategy may be implemented in any form including, but not limited to, rules, processes, functions, formulas, equations, linear feedback shift register, look up tables, mappings, etc., or any combination thereof.

In some embodiments, the reference identifier is not generated unless a predetermined sequence of instructions referred to herein as a retrieve sequence is executed.

In order to make it more difficult to tamper with and/or defeat the security system 100, this embodiment further includes a control module 134 that receives a reset signal (on a line 136), and a read/write signal (on a line 138), and supplies a control signal (on a line 140) to the encryption module 122 that limits the number of times that a reference identifier 101 can be generated after a reset or power up.

It is expected that there may be attempts to tamper with and/or defeat the security system 100 by reading the identifier code 120. Thus, as with the reference identifier, the identifier code 120 is preferably hidden from the normal user. Consequently, the identifier code is preferably not directly accessible and not directly alterable by way of the program being executed. This makes it more difficult to tamper with and/or defeat the security system 100. In some embodiments, the identifier code 120 is stored in a non-public address in an address map of the processor core, so as to help "hide" (i.e., make it more difficult to discover) the identifier code.

However, as stated above, it is expected that the cell phone manufacturer will take steps to ensure that software intended to be used in association with a particular cell phone will have a program identifier that matches the reference identifier of that particular cell phone. Consequently, the phone manufacturer may need to access the identifier code that has been embedded within the processor core of the cell phone.

Thus, it may be desirable to make the identifier code indirectly accessible, for example using a predetermined sequence of instructions or operations referred to herein as an access sequence. The access sequence may require that an access key (i.e., access code) be supplied. Note that the access sequence and key can be made customer specific (i.e., different for each phone manufacturer). Some embodiments require that a specific value or a sequence of values be written to specific register(s) and/or address(es) before the identifier code can be accessed.

This makes it more difficult to tamper with and/or defeat the system. The default value (the value received if the specific value is not written to the register or address) may be a dummy value. In some embodiments, the identifier code is made accessible only in an encrypted form (which may make use of an encryption strategy that is different than that used to generate the reference indicator).

However, it should be recognized that a security system that permits access (indirect or not) to the identifier code (encrypted or not) may not be as secure as one that does not provide any access at all to the identifier code. Consequently, some embodiments may make the identifier code completely inaccessible from outside the processor core.

Figure 5:
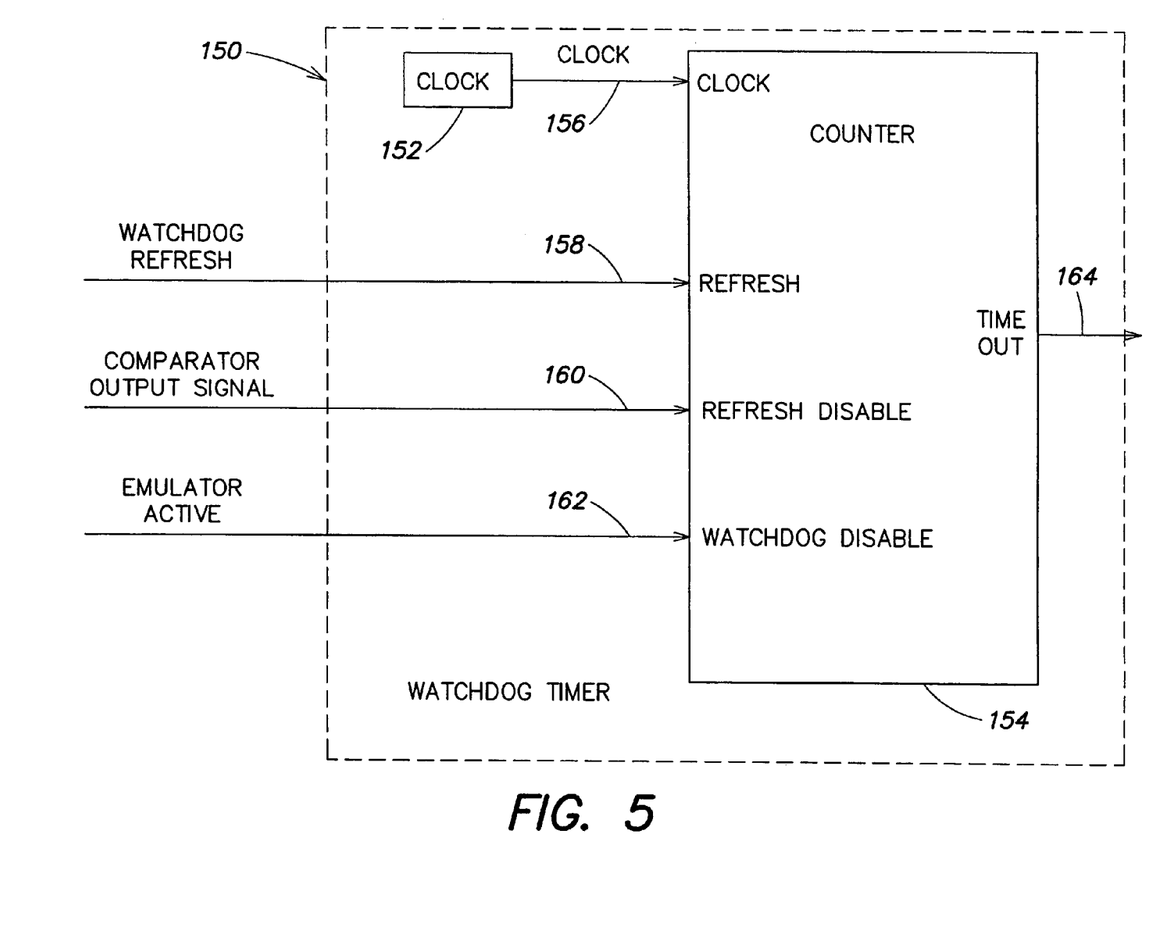
FIG. 5 is a block diagram of one embodiment of the disable system used in the security system of FIG. 2.

FIG. 5 illustrates one embodiment of the disable system 103 (FIG. 2). In this embodiment, the disable system 103 has the form of a watchdog timer circuit 150. Watchdog timer circuits are a type of supervisory circuit and are commonly used in microprocessor-based circuits. The purpose of a watchdog timer circuit is to help determine if a microprocessor is operating undesirably. This is important because there are a variety of situations that can arise and cause a microprocessor to operate undesirably. These include (1) a glitch and/or hardware failure that corrupts an instruction and/or causes the microprocessor to jump to an improper address, and (2) a software error such as an infinite loop. Watchdog timer circuits typically require a microprocessor to occasionally assert a signal in order to assure the watchdog timer circuit that the microprocessor is not operating undesirably. If the microprocessor does not assert the signal as required, then the watchdog timer circuit initiates a reset or some other action to interrupt the operational sequence of the microprocessor.

The watchdog timer circuit 150 has a clock 152 and a counter 154. The clock 152 generates a clock signal, which is supplied to a clock input on the counter 154. The counter 154 has three other inputs (refresh, refresh disable and watchdog disable) and an output (time out). The clock input receives the clock signal on a signal line 156. The refresh input receives a watchdog refresh signal (which is driven by the processor core) on a signal line 158. The refresh disable input receives the comparator output signal on a signal line 160. The watchdog disable input receives an emulator active signal (driven by the processor core) on a signal line 162. The time out signal is output on a line 164.

The operation is as follows. The counter 154 counts the clock pulses on the clock signal. If the count reaches a specified count (which corresponds to a specified time interval, or duration) the circuit asserts the time out signal, which in turn initiates a reset or some other action to interrupt the operational sequence of the processor core. In some embodiments, the specified count may correspond to about 4 seconds after reset and/or power up. The counter 154 is reset if the refresh input is asserted, unless the refresh disable input is also asserted. However, the refresh is disabled so long as the comparator output signal indicates that the comparator 102 has not received matching identifiers. Thus, the watchdog timer circuit 150 will assert the time out signal unless the comparator 102 receives matching identifiers before the counter 154 reaches the specified count.

Because the emulator active signal is supplied to the watchdog disable input, the watchdog timer circuit 150 is disabled if an emulator is active. Although not required, this arrangement makes it more difficult to use an emulator to discover information that could be used to tamper with and/or defeat the security system 100.

It should be understood that in other embodiments, the disable system 103 may or may not have the form of a watchdog timer circuit 150. Furthermore, other embodiments may or may not disable the cell phone within a specified duration after reset or power up.

Figure 6A:
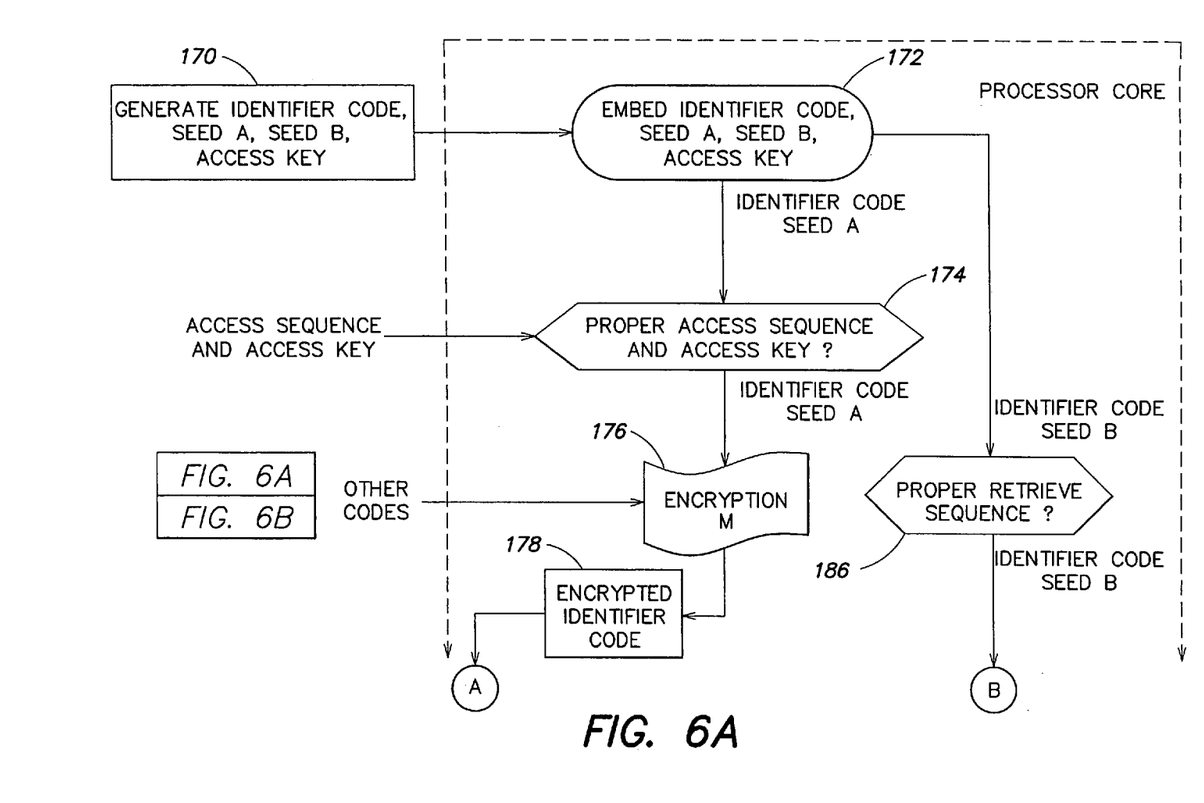
FIG. 6 is a diagram showing a method/features used in implementing one embodiment of the security system of FIG. 2.
Figure 6B:
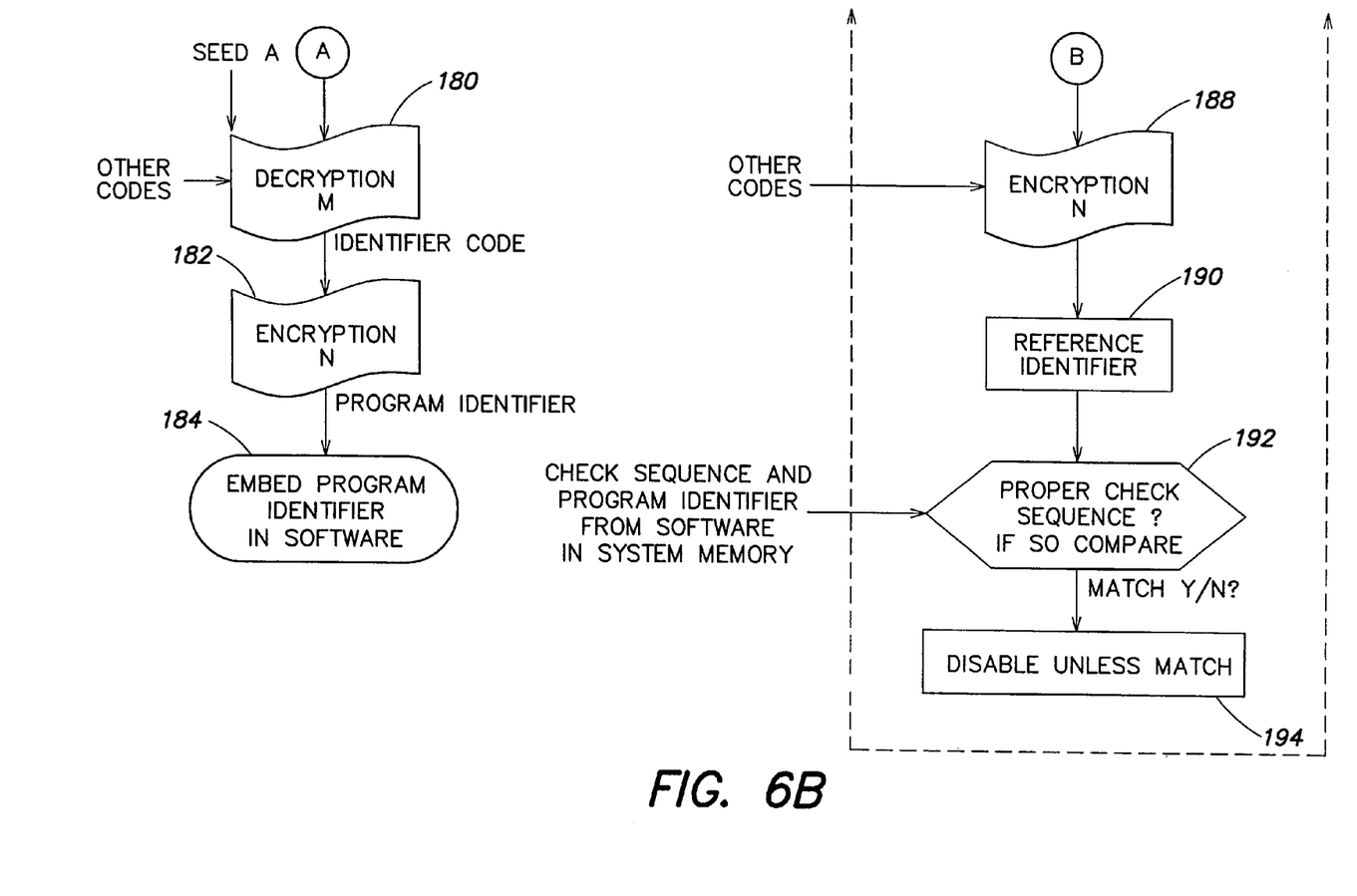

FIG. 6 is a diagram showing a method/features used in implementing one embodiment of the security system of FIG. 2. In this embodiment, the reference identifier is based on an identifier code and a seed, as described above with respect to FIG. 4. The identifier code is indirectly accessible (in an encrypted form that is based on seed) using an access sequence with an access key. It should be recognized that not all of the method/features shown in and/or described with respect to FIG. 6 will be used in every embodiment. It should also be recognized that some method/features are within the processor core and some are not.

Referring now to FIG. 6, an identifier code, a seed A, a seed B, and an access key are generated, as indicated at 170. A random number generator may be used but is not required. It may be desirable to make the identifier code and/or the seeds vary from processor core to processor core. There is, however, no requirement that every processor core have a unique identifier code and/or seeds. The seeds and/or the access key may be made customer specific (i.e., different for each phone manufacturer).

As indicated at 172, the identifier code, the seed(s), and the access key are embedded into the processor core. This may be carried out in a variety of ways. One way is to embed the definitions in the physical data/netlist that constitutes the processor core. If a single reticle mask is used, then the number of different identifier codes and seeds may depend on the number of dies that can be placed on a reticle, e.g., 8 or 12. Note that the fewer the number of different identifier codes the greater is the benefit of the seeds. It may be desirable to update the identifier codes and/or seeds at regular intervals and/or whenever a mask revision is generated. The definition for the identifier code and/or the seeds may be—but need not be—implemented on a single layer of metal so as to facilitate such revisions.

A second way is to embed the definitions into the processor core after the processor core has been fabricated. This is possible where the processor core has one or more type(s) of programmable elements, for example, but not limited to, programmable fuses (electrical or laser), programmable links, one-time-programmable FLASH memory or register, EEPROM, and combinations thereof. Fuses typically have a low impedance unless "blown". Programmable links typically have a high impedance unless programmed. If erasable or reprogrammable elements are used, it may be desirable to make it difficult to erase and/or the identifier. In addition, it may be desirable to include an additional, one-time-reprogram programmable code that indicates whether or not the identifier code is to be made accessible. If the identifier code is not accessible, it may be desirable to maintain a database of identifier codes so as to retain the ability to make updates to the software. The measures may for example be carried out by (i.e., by or on behalf of) the manufacturer of the processor core or by the phone manufacturer.

As indicated at 174, the cell phone manufacturer supplies the access sequence including an access key to the processor core. If the proper access sequence and access key have been supplied, then the processor core encrypts the identifier code using an encryption strategy M and the seed A, as indicated at 176, and stores the encrypted identifier code in a register 178. The encrypted identifier code is then output from the processor core through a parallel port or a serial link (e.g., JTAG or similar).

To make it more difficult to tamper with and/or defeat the security system, one or more of the following (and other) measures may be taken in connection with the access sequence:
 (1) The access sequence may be disabled if not executing out of the boot program.
 (2) The seed, the access key, and the identifier code are read from storage locations within the processor core, but not by way of the bus; the bus is driven to all zero's.
 (3) A series of writes and/or reads must be carried out to/from specific register(s) and/or address(es).
 (4) The access key must be written to some register or addresses before the identifier code can be accessed.
 (5) The access key stored in the processor core is compared to the one supplied as part of the access sequence, and if they are equal, a flag is set for a certain number of cycles.
 (6) If the operations in the access sequence are not executed in the proper order or within a certain number of cycles, then zero is stored in the access register.
 (7) After a certain number of cycles, the flag and the register are reset, thereby disabling any further attempts to access the identifier code.
 (8) Only one access sequence can be carried out after a reset.
 (9) If the proper key is not supplied during the access sequence, then the identifier code (encrypted or not) is not stored in the access register. Instead, a random or pseudo random code is stored in the access register.
 (10) During a read of the identifier code (encrypted or not) in the access register, a dummy read access to an on board memory location (e.g., ROM) is performed in order to change the value on the memory output.

In some embodiments, the following three conditions must be met in order to get a valid identifier code through a parallel port:
 (1) the instructions that form the access sequence must be fetched from memory (e.g., a ROM or a SRAM, whichever may be available) on the processor core,
 (2) the predetermined sequence of operations must be carried out within a certain number of clock cycles, and
 (3) interrupts must be disabled.

Note that an encrypted identifier code can be made further dependent on the other components in the cell phone by using a seed code generated from identifier codes of other components of the cell phone. One sequence to generate such a code is as follows. Read the identifier codes from one or more other components and generate a seed code. Write the seed code into a seed register. Read the identifier code as described above, in which case the encrypted identifier code will be a combination of the identifier code of the processor core and the identifier code(s) of one or more other components.

As indicated at 180, the cell phone manufacturer decrypts the encrypted identifier code, using a decryption strategy M (corresponding to encryption strategy M used by the processor core) and the seed A (and any other codes that had been used in the encryption), to obtain the identifier code. At 182, the identifier code is encrypted using an encryption strategy N (corresponding to that which will be used in the processor core to generate the reference identifier) and the seed B (and any other desired codes), to generate a program identifier that will match the reference identifier to be generated in the processor core (during operation of the phone). The program identifier is then embedded into the software in the system memory, as indicated at 184.

In this embodiment, a predetermined sequence of operations must be executed in order to initiate the generation of the reference identifier. This predetermined sequence of operations is referred to herein as a "check sequence". In this embodiment, instructions to carry out the retrieve sequence are stored in the processor memory (e.g., in the boot program (FIG. 3), which is executed on reset or power up). A predetermined sequence of operations must also be executed in order to initiate a comparison of the program identifier and the reference identifier. This predetermined sequence of operations is referred to herein as a check sequence. In this embodiment, instructions to carry out the check sequence are embedded in the software in the system memory.

The retrieve sequence is executed during the operation of the cell phone (e.g., on reset or power up), as indicated at 186, to initiate generation of the reference identifier. As indicated at 188, the processor core encrypts the identifier code using the encryption strategy N and the seed B (and any other codes supplied to the processor core) to generate the reference identifier, which is stored in a register 190. In some embodiments, the retrieve sequence may be performed only one time after reset and/or may incorporate one or more of the measures described above for the access sequence.

The check sequence is then executed to initiate a comparison of the program identifier and the reference identifier, as indicated at 186. If the program identifier and the reference identifier do not match one another, then a disable signal to disable an operating characteristic of the cell phone is generated, as indicated at 194.

As stated above, the embodiment of FIG. 6 includes various measures. Not all of these measures will be used in every situation. Note that it is typically desirable for the definition of the access sequence, the access key, the check sequence, the encryption, the location of any registers, and the location of any memory locations employed in the security system to be kept as confidential as possible.

In some embodiments, the predetermined sequences of instructions are made up of instructions from the normal instruction set of the processor core. The instructions may or may not be instructions that are frequently used elsewhere in the software.

Figure 7:
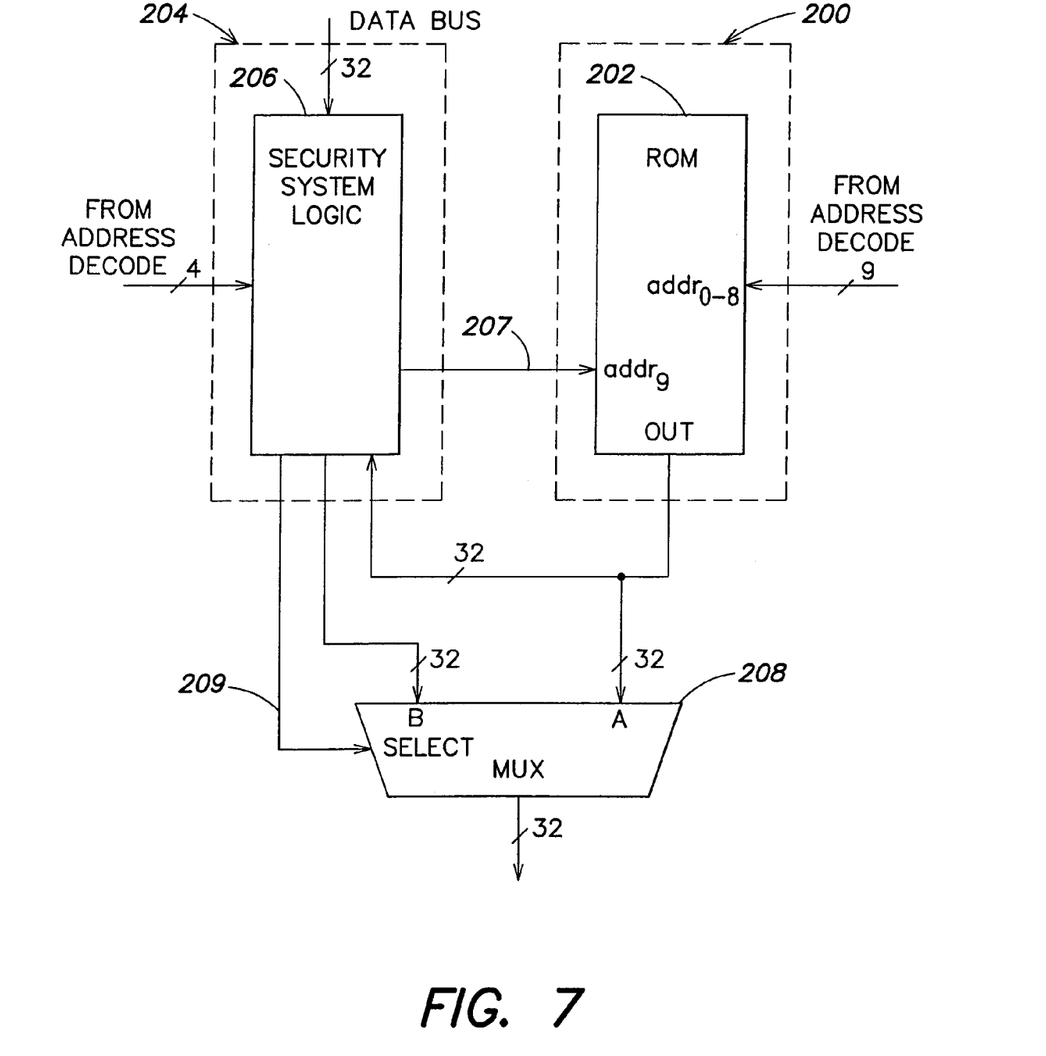
FIG. 7 is a block diagram of a portion of one embodiment of the security system of FIG. 2.

FIG. 7 shows a processor memory 200 with a ROM 202 that includes address space reserved for parameters of the security system 204. The ROM 202 has 520 addresses. The addresses above 511 are reserved for the identifier code, seeds, and the access key. The ROM 202 is addressed by way of ten address bits, $addr_{0-9}$. The nine least significant address bits, $addr_{0-8}$, are supplied with nine bits from an address decode. The most significant address bit, $addr_9$, is supplied with a bit on line 207 from the security system logic 206. The reserved addresses are accessible only if the security system logic 206 asserts the most significant address bit, $addr_9$.

The 32-bit output from the ROM 202 is supplied to the security system logic 206 and one of two 32-bit inputs on a multiplexer 208. The security system logic 206 is further supplied with four bits from the address decode and thirty-two bits from the data bus. The security system logic 206 supplies a 32-bit signal to the second 32-bit input on the multiplexer 208 and drives a multiplexer select line 209. The muliplexer 208 outputs a 32-bit signal.

The operation is as follows. If the security system logic 206 determines that the appropriate sequence has been provided, then the security system logic 206 asserts $addr_9$ and the multiplexer select line 209 to allow the reserved addresses in the ROM 202 to be accessed and output from the multiplexer 208. If the appropriate sequence has not been supplied, then the security system logic 206 does not assert $addr_9$. Instead, the security system logic 206 supplies a random or pseudo random code, which is then output by the multiplexer 208.

When we use the term "in response to" we mean "in response at least to", so as not to preclude being responsive to more than one thing.

Although the security system has been described with respect to a baseband processor for use with a cell phone, the present invention is not limited to such embodiments or uses. Rather, other embodiments may be used with in connection with any electronic device, including but not limited to a portable digital assistant.

While there have been shown and described various embodiments, it will be understood by those skilled in the art that the present invention is not limited to such embodiments, which have been presented by way of example only, and that various changes and modifications may be made without departing from the spirit and scope of the invention. Accordingly, the invention is limited only by the appended claims and equivalents thereto:

What is claimed is:

1. A method for preventing the use of unauthorized software stored in memory of a device containing a processor core, the method comprising:
    storing an identifier code in the processor core and generating a reference identifier from the identifier code, wherein the identifier code is not readable by simply executing a read instruction that specifies an address a which the identifier code may be stored;
    receiving the reference identifier from within the processor core;
    receiving a program identifier from the software;
    comparing the reference identifier and the program identifier beyond the control of run-time software being checked for authorization; and
    responding to the comparison beyond the control of the run-time software being checked by disabling an operating characteristic of the processor core unless the comparison indicates that the program identifier and the reference identifier have at least a specified measure of correspondence to one another.

2. The method of claim 1 wherein responding comprises responding independently of software stored in memory of the device.

3. The method of claim 1 wherein responding comprises responding exclusively in hardware of the device.

4. The method of claim 1 wherein responding comprises receiving a signal through a data path separate from the address/data bus.

5. The method of claim 1 further comprising encrypting an identifier code stored in the processor core and generating the reference identifier from the encrypted identifier code.

6. The method of claim 5 wherein encrypting comprises encrypting the identifier code in response to an encryption strategy and a seed provided by the software stored in memory of the device.

7. The method of claim 1 wherein the identifier code can only be accessed in encrypted form.

8. The method of claim 7 further comprising determining the identifier code using decryption, generating the program identifier from the identifier code and an encryption strategy, and storing the program identifier with the software stored in memory of the device.

9. The method of claim 1 further comprising generating the reference identifier during operation of the device from the identifier code and storing the reference identifier in memory of the device.

10. The method of claim 1 wherein disabling of an operating characteristic of the processor core occurs within a specified duration after the comparison.

11. The method of claim 1 wherein responding further comprises not disabling an operating characteristic of the processor core if an emulator is active.

12. The method of claim 1 wherein disabling comprises disabling refresh of a watchdog timer circuit within a specified duration from the comparison.

13. The method of claim 12 wherein the watchdog timer circuit is disabled if an emulator is active.

14. The method of claim 1 wherein the device is a cell phone.

15. The method of claim 1 wherein the identifier code is accessible only by executing a predetermined, secret sequence of operations that includes a read operation.

16. A processor core of an electronic device comprising:
    a comparator, which operates beyond the control of run-time software running on the processor core, that receives a reference identifier from within the processor core, receives a program identifier associated with software stored in a memory of the device, and generates a first signal indicating whether the reference identifier and the program identifier have at least a specified measure of correspondence to one another; and a disable system, which operates beyond the control of run-time software running on the processor core, that receives the first signal from the comparator and generates a second signal to disable an operating characteristic of the processor core unless the first signal indicates that there is at least a specified measure of correspondence between the program identifier and the reference identifier.

17. The processor core of claim 16 further comprising a register to store the reference identifier and wherein the comparator is operatively coupled to the register by a data path separate from a data path that couples the processor core and memory of the device.

18. The processor core of claim 17 wherein the disable circuit receives the signal through a data path separate from the data path that couples the processor core and memory of the device.

19. The processor core of claim 16 wherein the disable circuit receives the signal through a data path separate from the data path that couples the processor core and memory of the device.

20. The processor core of claim 16 further comprising a digital circuit that encrypts an identifier code stored in the processor core and generates the reference identifier from the encrypted identifier code.

21. The processor core of claim 20 wherein the processor core does not allow the identifier code to be read by simply executing a read instruction that specifies an address at which the identifier code may be stored.

22. The processor core of claim 20 wherein the processor core allows access to the identifier code only in encrypted form.

23. The processor core of claim 20 wherein the processor core allows access to the identifier code only by executing a predetermined, secret sequence of operations that includes a read operation.

24. The processor core of claim 16 wherein the disable system does not generate the signal to disable if an emulator is active.

25. The processor core of claim 16 wherein the disable system comprises a circuit to disable refresh of a watchdog timer circuit.

26. The processor core of claim 25 wherein the watchdog timer circuit is disabled if an emulator is active.

27. The processor core of claim 16 wherein the comparator is a digital circuit.

28. The processor core of claim 16 wherein the disable system is a circuit.

29. The processor core of claim 16 wherein the reference identifier is not accessible through an external terminal of the processor core.

30. An electronic device comprising:
a memory;
software that is stored in the memory and includes a program identifier;
a processor core coupled to the memory through a data path, the processor core including a comparator that operates beyond the control of run-time software and receives a reference identifier from within the processor core and the program identifier, and in response thereto, generates a signal indicative of a measure of correspondence between the reference identifier and the program identifier, the processor core further including a disable system that operates beyond the control of run-time software and is responsive to the signal generated by the comparator and configured to disable an operating characteristic of the electronic device unless the signal indicates that there is at least a specified measure of correspondence between the reference identifier and the program identifier.

31. The electronic device of claim 30 wherein the comparator and the disable system are circuits.

32. The electronic device of claim 30 wherein the electronic device is a cell phone.

33. The electronic device of claim 30 wherein the processor core further comprises a register to store the reference identifier and wherein the comparator is operatively coupled to the register by a data path separate from the data path that couples the processor core and the memory.

34. The electronic device of claim 30 wherein the disable system receives the data through a data path separate from the data path that couples the processor core and the memory.

35. The electronic device of claim 30 wherein the processor core further comprises a digital circuit that encrypts an identifier code stored in the processor core and generates the reference identifier in response to the encrypted identifier code.

36. The electronic device of claim 35 wherein the processor core provides indirect access to a form of the identifier code from outside the processor core.

37. The electronic device of claim 35 wherein the processor core provides indirect access to an encrypted form of the identifier code.

38. The electronic device of claim 35 wherein the processor core prevents direct access to the identifier code from outside the processor core.

39. The electronic device of claim 30 wherein the disable system does not generate the signal to disable if an emulator is active.

40. The electronic device of claim 30 wherein the disable system comprises a circuit to disable refresh of a watchdog timer circuit.

41. The electronic device of claim 40 wherein the disable system comprises a circuit to disable a watchdog timer circuit if an emulator is active.

42. The electronic device of claim 30 wherein the reference identifier is not accessible through an external terminal of the processor core.

43. A cell phone for mobile communication, the cell phone having a processor that includes a processor core and a memory, the processor core being coupled to the memory through a data path, the memory being usable to store software that includes a run-time program and an identifier associated with the software, wherein the improvement comprises:
a comparator, within the processor core, that operates beyond the control of run-time software and receives a reference identifier from within the processor core and a program identifier associated with software stored in a system memory, and generates data that signifies receipt, or lack thereof, of a reference identifier and a program identifier having at least a specified measure of correspondence to one another; and
a disable system, within the processor core and responsive to the data indicative of a measure of correspondence, that operates beyond the control of run-time software and generates a signal to disable an operating characteristic of the processor core unless the data indicates that there is at least a specified measure of correspondence between the program identifier and the reference identifier.

* * * * *

UNITED STATES PATENT AND TRADEMARK OFFICE
CERTIFICATE OF CORRECTION

| | | |
|---|---|---|
| PATENT NO. | : 7,454,169 B2 | Page 1 of 1 |
| APPLICATION NO. | : 10/208965 | |
| DATED | : November 18, 2008 | |
| INVENTOR(S) | : Joern Soerensen | |

It is certified that error appears in the above-identified patent and that said Letters Patent is hereby corrected as shown below:

In column 14, Line 3-21 please replace claim 1 with the following edited version:

1. A method for preventing the use of unauthorized software stored in memory of a device containing a processor core, the method comprising:
        storing an identifier code in the processor core and generating a reference identifier from the identifier code, wherein the identifier code is not readable by simply executing a read instruction that specifies an address [[a]] at which the identifier code may be stored;
        receiving the reference identifier from within the processor core;
        receiving a program identifier from the software;
        comparing the reference identifier and the program identifier beyond the control of runtime software being checked for authorization; and
        responding to the comparison beyond the control of the run-time software being checked by disabling an operating characteristic of the processor core unless the comparison indicates that the program identifier and the reference identifier have at least a specified measure of correspondence to one another.

Signed and Sealed this

Twenty-fourth Day of February, 2009

JOHN DOLL
*Acting Director of the United States Patent and Trademark Office*